United States Patent
Flood et al.

(10) Patent No.: US 11,345,614 B1
(45) Date of Patent: May 31, 2022

(54) COMPOSITE PARTICLE AND METHOD FOR REMOVING CONTAMINANTS FROM LIQUIDS

(71) Applicant: Nanotech Innovations, LLC, Oberlin, OH (US)

(72) Inventors: Dennis J. Flood, Oberlin, OH (US); Dennis M. Flood, Oberlin, OH (US); Jason M. Belitsky, Oberlin, OH (US); Chad A. Coolidge, Vermilion, OH (US); Cody M. Flood, Oberlin, OH (US)

(73) Assignee: Nanotech Innovations, Inc., Oberlin, OH (US)

( * ) Notice: Subject to any disclaimer, the term of this patent is extended or adjusted under 35 U.S.C. 154(b) by 400 days.

(21) Appl. No.: 16/384,373

(22) Filed: Apr. 15, 2019

Related U.S. Application Data

(60) Provisional application No. 62/658,154, filed on Apr. 16, 2018.

(51) Int. Cl.
*C02F 1/28* (2006.01)
*B01J 20/28* (2006.01)
(Continued)

(52) U.S. Cl.
CPC ......... *C02F 1/288* (2013.01); *B01J 20/28004* (2013.01); *B01J 20/28016* (2013.01);
(Continued)

(58) Field of Classification Search
None
See application file for complete search history.

(56) References Cited

U.S. PATENT DOCUMENTS

| 7,964,174 B2 | 6/2011 | Dubin |
| 8,541,060 B2 | 9/2013 | Messersmith |

(Continued)

FOREIGN PATENT DOCUMENTS

| CN | 103012806 | 4/2013 |
| CN | 103012806 A * | 4/2013 |

(Continued)

OTHER PUBLICATIONS

Machine translation of CN103012806A, pp. 1-5. (Year: 2013).*
Machine translation of CN105478074A, pp. 1-7. (Year: 2016).*

*Primary Examiner* — Clare M Perrin
(74) *Attorney, Agent, or Firm* — Kathryn Perales

(57) ABSTRACT

Described here is a free-standing composite particle with a large surface area. The particle is capable of adsorbing heavy metal contaminants from water. The particle itself is comprised of a granular activated carbon particle to which are attached one or more carbon nanotubes, the combination of which is covered by at least a partial thin film of polydopamine or other polymeric material derived from dopamine-like compounds. The composite particles are mixed with contaminated water, after which the water and particle mixture is injected into a hydrocyclone separator specifically designed for use with the composite particle. The hydrocyclone separator removes the particles from the water, allowing the particles holding the contaminants to be extracted for treatment, while the purified water flows out of the separator for reuse. The separated particles can be treated to remove all the adsorbed contaminants, after which the reclaimed particles may be reused.

10 Claims, 6 Drawing Sheets

(51) Int. Cl.
  B01J 20/30  (2006.01)
  B01J 20/32  (2006.01)
  B01J 20/34  (2006.01)
  *C02F 101/20*  (2006.01)

(52) U.S. Cl.
  CPC ....... B01J 20/3071 (2013.01); B01J 20/3204 (2013.01); B01J 20/324 (2013.01); B01J 20/3236 (2013.01); B01J 20/3244 (2013.01); B01J 20/3289 (2013.01); B01J 20/3295 (2013.01); B01J 20/3416 (2013.01); *B01J 2220/46* (2013.01); *B01J 2220/4806* (2013.01); *B01J 2220/50* (2013.01); *C02F 2101/20* (2013.01)

(56) References Cited

U.S. PATENT DOCUMENTS

| | | | |
|---|---|---|---|
| 2003/0072942 A1 | 4/2003 | Hwang | |
| 2009/0220767 A1* | 9/2009 | Schlogl | B01J 23/745 428/323 |
| 2014/0252270 A1 | 9/2014 | Lehman | |

FOREIGN PATENT DOCUMENTS

| | | | |
|---|---|---|---|
| CN | 105478074 A | * | 4/2016 |
| KR | 20170129336 | | 11/2017 |

* cited by examiner

COMPOSITE PARTICLE AND METHOD FOR REMOVING CONTAMINANTS FROM LIQUIDS

BACKGROUND OF THE INVENTION

Field of the Invention

The present invention relates generally to removing contaminants from liquids and is more specifically directed to effective removal of low level organic and inorganic contaminants from said liquids, one example of a liquid being water.

Description of Related Art

The Need for Clean Water

Demand for high quality water supplies, whether for human or animal consumption or for industrial and commercial application, continues to grow at a rapid pace. According to a 2009 report by the World Business Council for Sustainable Development, less than 3% of the world's water is fresh—the rest is seawater and undrinkable. Over 80% of the fresh water is frozen, locked up in Antarctica and the Arctic and not easily available for human use. As a result all living things, and humankind in particular, must rely on about 0.5% of the total world supply of water for all fresh water needs.

Human per capita water use and the total volume of water use continue to grow. Water use is quantified in terms of freshwater withdrawals. Annual freshwater withdrawals refer to total water withdrawals, not counting evaporation losses from storage basins. Data on water consumption in the world provided by the United Nations (e.g., UN, UNESCO, and FAO) show that worldwide, agriculture accounts for 70% of all water consumption, compared to 20% for industry and 10% for domestic use. Withdrawals for agriculture are total withdrawals for irrigation and livestock production. In industrialized nations, however, commerce and industry consume more than half of the water available for human use. Freshwater withdrawals have tripled over the last 50 years and the demand for freshwater is increasing by 64 billion cubic meters a year. Among the reasons for the increased freshwater withdrawals are: 1) the world's population is growing by roughly 80 million people each year; 2) changes in lifestyles and eating habits in recent years are requiring more water consumption per capita; and 3) industrialization and energy demand are also accelerating, with corresponding implications for water demand.

Also growing is the rate at which freshwater supplies are becoming contaminated by human activity. Such activity includes agricultural chemical use (in the form of pesticides, herbicides, bactericides and fertilizers among other chemicals) and industrial and commercial chemical use (in the form of VOCs, surfactants, detergents, heavy metals and other chemicals.) The food processing industry also produces large effluents of contaminated water that may contain pesticide and bactericide residues. Freshwater consumption by individuals is also starting to become problematic. As populations age and consume more and more medications, the discharge of water to drainage and sewage systems becomes more and more contaminated with pharmaceutical residues. Given the seemingly exponential growth in freshwater demand, the limitations of current technology to effectively and efficiently remove contaminants that are often added by human use, and the limited amount of freshwater available to the planet, it becomes more and more necessary to find ways to conserve it. It is an aim of this invention to address that issue.

Current Water Cleanup Techniques

The current state of the art methods for commercial and industrial scale removal of contaminants such as heavy metals from solution typically include 1) ion exchange; 2) chemical precipitation using flocculants of various types to physically trap the metal ions; 3) reverse osmosis; 4) evaporation; 5) membrane filtration; and 6) adsorption. Systems based on such methods all have some drawbacks, among which are high capital and operational costs or the disposal of post-filtration products that may be considered to be hazardous.

VOC (volatile organic compound) removal from solution is typically accomplished by 1) air stripping or 2) adsorption by granular activated carbon particles (GAC). Air stripping is a process which injects air bubbles into the bottom of a chamber into which a volume of liquid is injected at the top. The air bubbles entrap the VOCs while the liquid flows downward over a bed of inert particles or trays of sieve-like material. The clean water exits the bottom of the unit and the VOC/air mixture exits the top of the stripper and passes through a bed of GAC for final removal of the VOCs. Removal and disposal of the VOCs trapped on GAC can be accomplished by Advanced Oxidative Processes (AOPs) or carefully controlled thermal treatment. Depending on the nature of the removal treatment, the carbon particles may be reactivated for continued use in removing VOCs.

Cleaning water by adsorbing low level concentrations of non-volatile contaminants, such as various heavy metal atoms and ions, is typically achieved by using granular activated carbon (GAC) in a flow through filter cartridge. When the cartridge capacity for the targeted contaminant has been reached, the GAC must be removed and replaced. The saturated GAC must then be disposed of safely and properly according to whatever government regulations are applicable to the location of use, adding to the cost of using such systems. Unlike the straightforward treatments for VOC removal from GAC, no such simple processes exist for recovering heavy metals from GAC. As a result, the GAC must either be disposed of as a hazardous waste or burned in a manner that allows sequestering of the heavy metal contaminants from the combustion effluent.

Activation is a process that typically creates large numbers of 1-5 nanometer diameter pores, as well as large numbers of submicron and larger scale pores, in the surface of a carbon particle. The nanopores typically extend only a few nanometers into the carbon surface. Different activation processes achieve different ranges of pore sizes and volumes. The total surface area of a GAC particle is essentially the sum of all the pore side wall and bottom surface areas along with the remaining original surface area and can reach values ranging from 10's of square meters per gram to over a thousand square meters per gram.

Two difficulties of the approach using GAC are 1) entrapment of the targeted heavy metal contaminant ions, atoms and/or molecules in the pores is a stochastic process that works against the rapid adsorption of low level concentrations of contaminants; and 2) the heavy metal contaminant-saturated GAC does not allow for easy extraction of the adsorbed materials, since the bulk of the adsorbed materials resides inside the pores. The contaminant-laden GAC effectively becomes a hazardous material in its own right once fully saturated with the targeted contaminant material. As such it must be disposed of under strict regulations concerning such material.

BRIEF SUMMARY OF THE INVENTION

The present invention provides a free-standing composite particle (FSCP) that has superior properties for use as an adsorbent for removing low level contaminants from water, by way of example but not of limitation. The free-standing composite particle has an adsorbing surface area no longer primarily comprised of the interior surfaces of the pores of the granular activated carbon (GAC) particles of the prevailing current art. Rather, the adsorbing area of the composite particle is comprised of the totality of the surfaces of the GAC and carbon nanostructures that are attached to the surface of the core GAC particle, and has a partial thin coating of a polymeric material made from a catechol material such as dopamine, all of which makes a more favorable configuration for adsorption of contaminants.

In one embodiment of the present invention, presented only as an example and in no way as a limitation on the particle's usefulness, the free-standing composite particle is introduced into and mixed with a volume of contaminated water for a period of time sufficient to adsorb a measured amount of the targeted contaminants, following which the free-standing composite particles are removed from the water by one or more hydrocyclone separators operating in series, as may be needed. The final hydrocyclone separator may be modified to accept a removable screen made with a predetermined mesh size to assure that 100% of the contaminant-carrying composite particles are removed from the water prior to being discharged into a holding tank for reuse or a drain for disposal.

In another embodiment of the present invention, the free-standing composite particle may be used as the absorbent in a typical filter bed configuration for removing contaminants from liquids, including as an example but not a limitation, water.

A major advantage of the present invention is that, unlike raw GAC particles, the said composite particles of the present invention are easy to reuse after having adsorbed the heavy metal contaminants, the reusability being accomplished by straightforward and easily managed chemical processes.

BRIEF DESCRIPTION OF THE DRAWINGS

Embodiments of the present invention will now be described with reference to the attached Figures, wherein.

DETAILED DESCRIPTION OF THE INVENTION

The present invention enables a novel way to remove contaminants from liquids. By way of clarification and not of limitation, the discussion of the present invention throughout this application shall focus on its use in a novel process to remove heavy metal contaminants from water.

Figure 1:
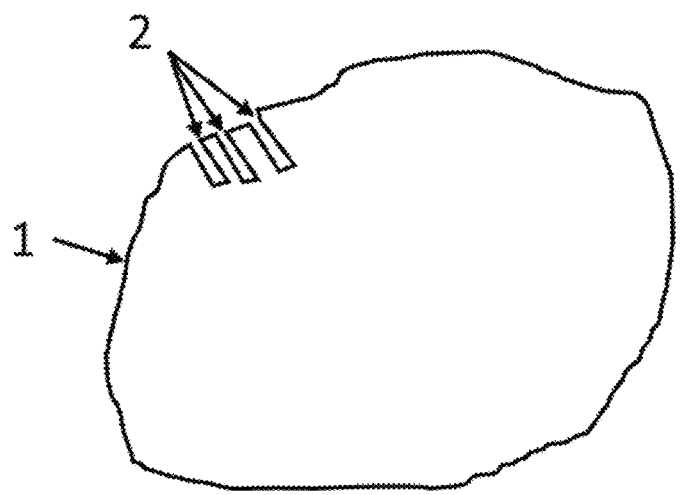
FIG. 1 illustrates a cross-section of a granular activated carbon (GAC) particle (1) with a representation of the pores (2) created by the activation process. The figure is not to scale.
Figure 2:
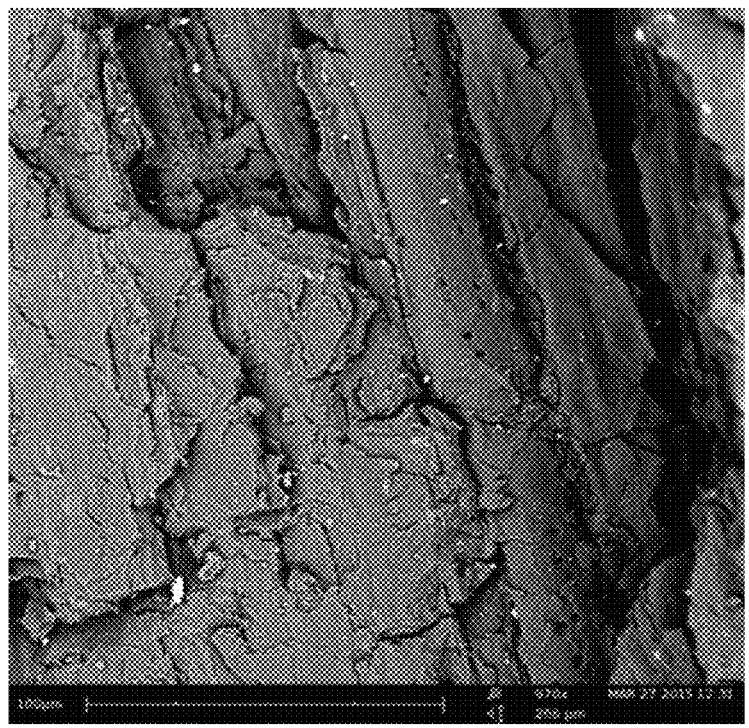
FIG. 2 is an SEM (Scanning Electron Microscope) image of the surface of a GAC particle that reveals micron scale, and larger, pores and openings.
Figure 3:
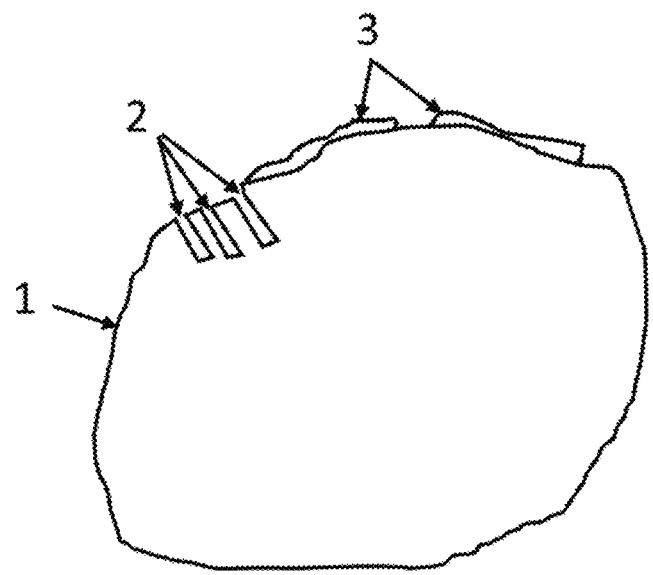
FIG. 3 illustrates the cross-section of a thin metal film (3) partially covering at least a portion of the surface of a GAC particle (1). The figure is not to scale.
Figure 4:
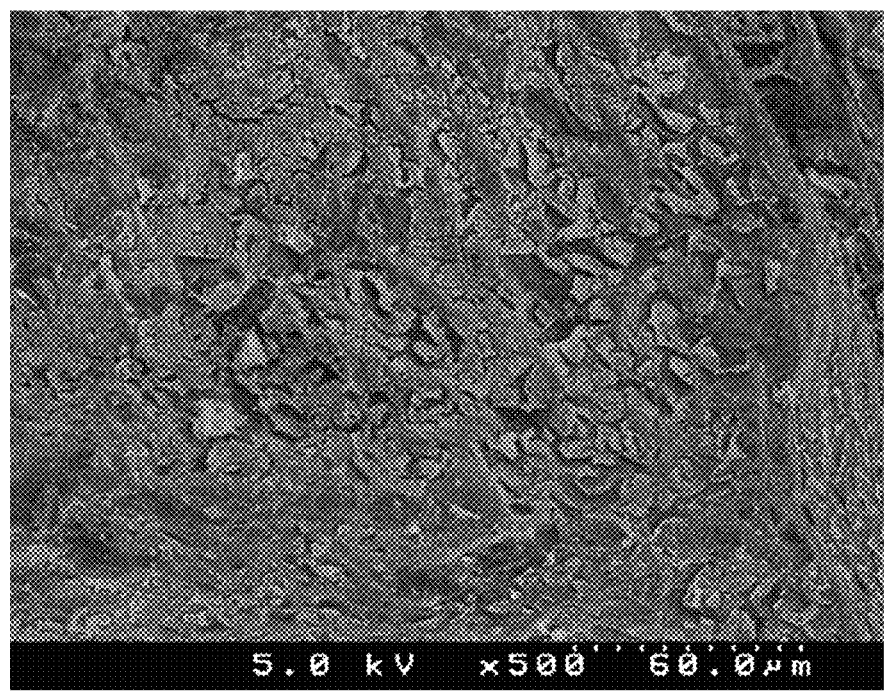
FIG. 4 is an SEM image of the said metal film on the surface of a GAC particle.
Figure 5:
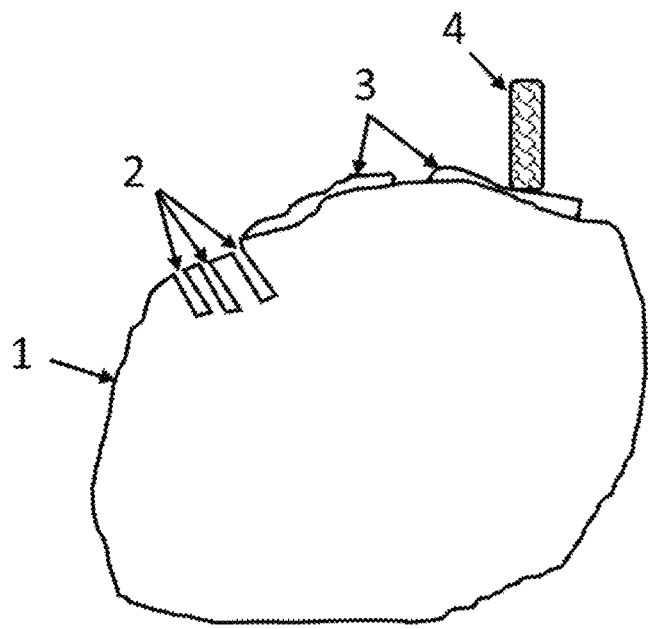
FIG. 5 illustrates at least one carbon nanotube (4). The carbon nanotube (CNT) may be of any type, chirality, diameter and length greater than about 5 nanometers, the growth of which has been catalyzed by said metal film (3) of FIG. 3. The figure is not to scale.
Figure 6:
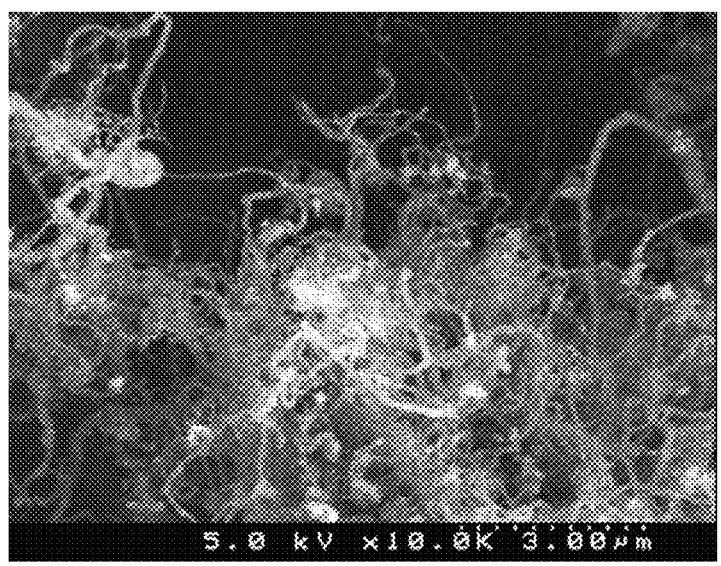
FIG. 6 is an SEM image of CNTs grown on the surface of GAC.
Figure 7:
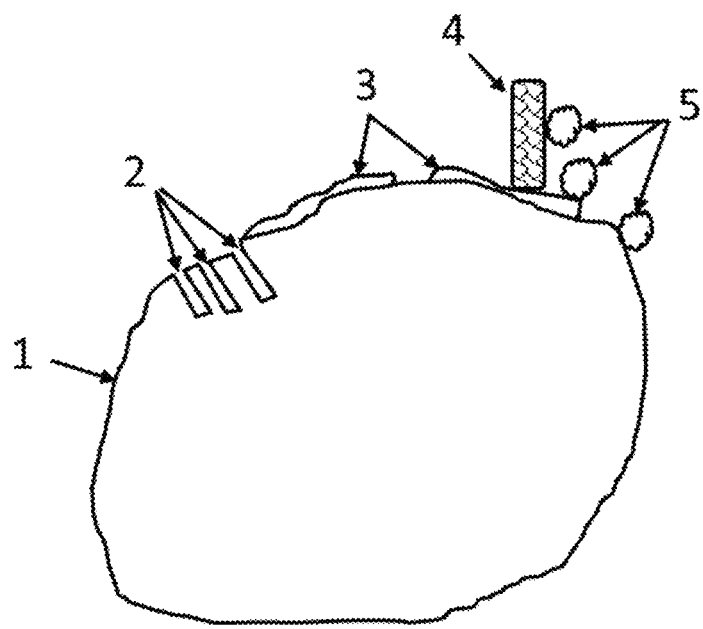
FIG. 7 depicts the presence of multi-nanometer-scale or larger particles (5) of polydopamine (PDA) or similar polymeric material made from a precursor catechol such as dopamine that may be attached to at least a portion of one or more said carbon nanotubes (4) or to at least a portion of the surface of said particle of granular activated carbon (1), or to at least a portion of said metal film (3). The figure is not to scale.
Figure 8:
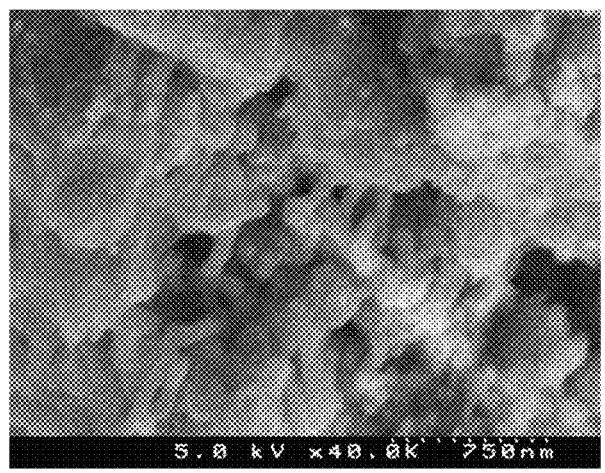
FIG. 8 is an SEM image of PDA coated nanotubes on GAC.
Figure 9:
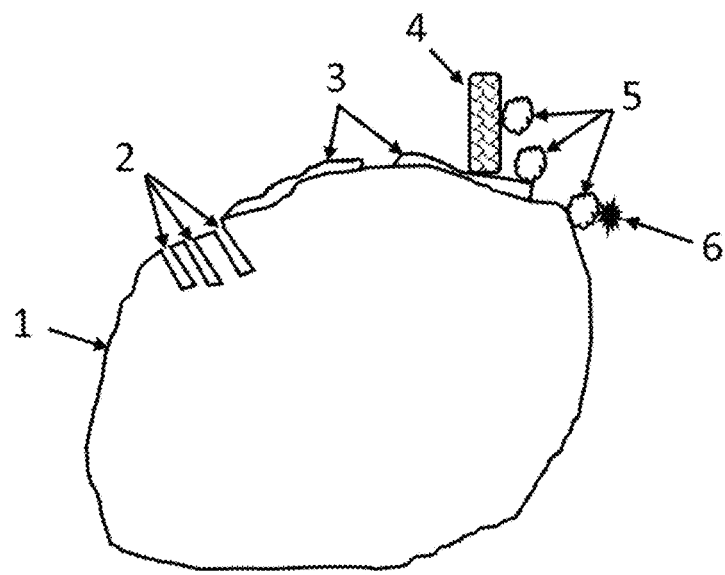
FIG. 9 shows the adsorption of at least one heavy metal contaminant (6) on at least a portion of the surface of at least one of the said particles (5) of FIG. 7. The figure is not to scale.

The composite particle is comprised of the following: 1) a core particle of granular activated carbon (GAC) (1) as shown in FIG. 1; 2) a thin layer of one or more transition metals (3) as shown in FIG. 3, with the thin metal layer covering at least a portion of the GAC; 3) one or more carbon nanotubes (4) shown in FIG. 5, each carbon nanotube having any number of walls, chirality, purity, defect density and length greater than about 5 nanometers, and being attached to at least a portion of the thin metal layer; and 4) a thin coating of a polymeric material such as polydopamine shown as (5) in FIG. 7, that coats at least a portion of the carbon nanotubes and at least a portion of any exposed areas of the GAC core particle with or without the thin metal layer.

Figure 10:
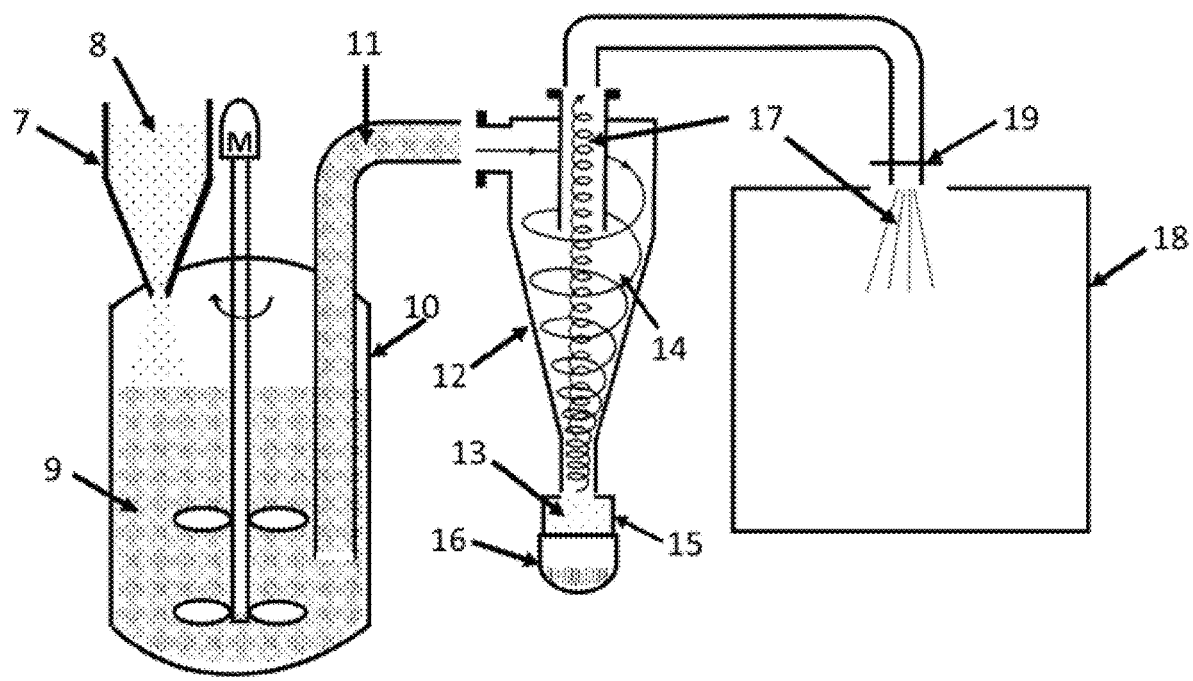
FIG. 10 is a diagram of the water clean-up apparatus and process using the composite particles of the present invention and shows a first container (7) containing clean composite particles (8) that are being dispensed into a volume of contaminated water (9) contained in a second container (10) with a means for agitating the water and particle mixture, with said mixture (11) flowing from the second container (10) to a hydrocyclone separator (12) that causes the contaminant-laden composite particles (13) to fall from the water column (14) into a collection container (15) and ultimately into a removable hopper (16), while the clean water (17) is sent through a conveyance apparatus into a final container (18) or simply disposed of. The removable screen separator (19) is shown in a potential location near the outlet of the conveyance apparatus.
Figure 11:
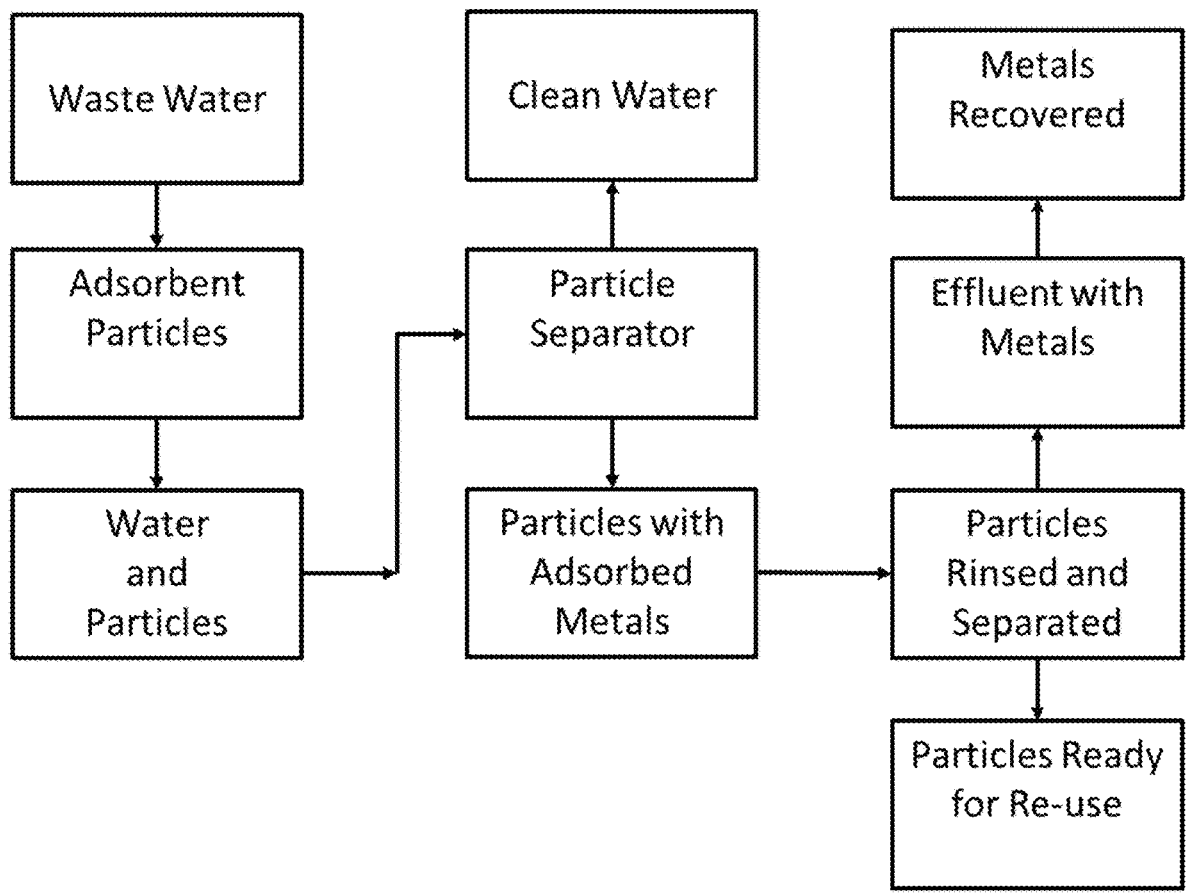
FIG. 11 is a process flow diagram depicting heavy metal capture, contaminant-containing composite particle separation from clean water, composite particle cleanup, particle treatment for re-use, and metal reclamation.

The free-standing composite particles are used as an adsorbent by simply introducing the particles into a vessel shown as (10) in FIG. 10, containing a volume (9) of contaminated water. The water with the composite particles is then mixed by agitation, stirring or some other appropriate means for a specified time.

After the mixing has taken place, during which the targeted contaminant(s) is/are adsorbed onto the composite particles, the particles are removed from the water by causing the water to flow through one or more hydrocyclone separators (12) in FIG. 10. The flow in a hydrocyclone separator exerts a centrifugal force on the contaminant-laden particles, causing them to migrate to the outer wall of the separator (12). The force of gravity will cause the particles to settle to the bottom of the separator (12) where they may be collected in a suitable vessel (16) in FIG. 10, while the water (17) with a reduced or even an effectively zero level of contaminants flows out of the top of the cyclone separator and into a storage tank (18). While cyclone separators are commonly used to separate and dispose of undesired particles such as sand and similar unwanted particles from liquids, it is novel to use them to intentionally recover particles specifically designed and fabricated to remove dissolved contaminants from liquids, as is the case with the present invention. As a final measure to assure 100% collection of the said contaminated particles, an optional, removable mesh screen (19) in FIG. 10 may be inserted in or after the final stage hydrocyclone separator. A minimum of two hydrocyclone separators may be optimal.

The free-standing composite particle will have a specific gravity in the range from about 1.3 g/cm$^3$ to about 2.3 g/cm$^3$ and will be at least moderately hydrophilic, both of which properties are favorable for efficient removal of contaminants from water and removal of the composite particles themselves from water in accordance with the present invention.

A first major advantage of using the composite particle and the apparatus of the present invention, compared to the typical use of a comparably-sized particle of granular activated carbon (GAC) in a filter bed, is that the adsorbing surface area is no longer primarily that of the interior surface of the pores. It is comprised of the external surfaces of the polymeric coated carbon nanostructures, along with the polymeric coating on interstitial areas not covered by carbon nanostructures, as well as any pores not filled or covered over by the thin films of metal and polymeric materials. Such a configuration is more favorable for rapid and more complete adsorption of contaminants.

A second major advantage of the present invention is that the composite particles may be collected at the end of the contaminant removal operation and conveyed to a particle reclamation site for stripping the contaminant-carrying polymeric material leaving a pristine CNT/GAC particle. The CNT/GAC particles may be recoated with pristine polymeric material and made available for reuse. The resulting contaminant-bearing residue may be treated in a manner that allows recovery of the contaminants for repurposing and/or safe and regulation-compliant disposal.

Alternately, the contaminant-saturated composite particles may be put through a suitable chemical rinse process that removes just the trapped contaminants from the polymer/CNT/GAC composite particles, leaving the polymeric coating intact and the composite particle ready for immediate reuse. As an example, the particles may be mixed with a metal chelating agent, such as ethylenediaminetetraacetic acid (EDTA). The resulting metal-free, composite particles may be removed from the EDTA by a simple filtration and rinsing process or even by cyclone separation, after which the particles may be reused for additional contaminant removal. The metal(s) in the EDTA effluent may be recovered for potential commercial use by any of several well-known procedures found in the literature. While cyclone separators are commonly used to separate and dispose of undesired particles such as sand and other inorganic particles from liquids, it is novel to use them to intentionally recover particles specifically designed and fabricated to remove dissolved contaminants from liquids, as is the case with the present invention.

A third major advantage of the present invention is its potential for low cost treatment operation and system maintenance over a wide range of operating scales, from laboratory benchtop systems to large commercial or industrial systems. This advantage results in part from not having to replace and/or refill spent filter cartridges.

The terminology used here is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising" when used in this specification, specify the presence of stated features, steps, operations, elements and/or components, but do not preclude the presence or addition of one or more other features, steps, operations, elements, components and/or groups thereof.

In describing the invention it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification should be read with the understanding that such combinations are entirely within the scope of the invention and its claims.

It is an objective of this invention to create a free-standing composite particle having a large specific surface area and to provide a novel technique to use the said free-standing composite particle in easily modified commercial equipment to adsorb targeted contaminants from liquids, especially water, and to remove captured contaminants from the particle for repurposing or safe disposal. The particle and novel technique may in particular be used for adsorbing a wide variety of contaminants from water, including heavy metal contaminants and/or volatile organic compounds.

A general embodiment of the current invention is a free-standing, composite particle adsorbing element comprised of non-functionalized and/or functionalized carbon nanotubes of any number of walls and chirality, whether defect free or not, with a minimum length greater than about 5 nanometers, that are attached to granular activated carbon particles (GAC), said GAC particles having average maximum dimensions between 100 nanometers and 10 millimeters. The GAC particles are coated in whole or in part with a catalytic metal thin film to support carbon nanotube growth by a chemical vapor deposition (CVD) process, the said carbon nanotubes having a thin coating of polydopamine or similar polymeric material, the average thickness of which is between 0.3 nanometers and fifty (50) nanometers.

A specific, non-limiting embodiment of the current invention is a free-standing composite particle making an adsorbent, the particle being comprised of carbon nanotubes that have been grown by a CVD technique on granular activated carbon particles that have themselves been coated in whole or in part with a catalytic metal thin film, the granular activated carbon particles having average diameters in the range of about 1.5 millimeters to about 3.5 millimeters, and having a thin coating of polydopamine or similar polymeric material, the thickness of which is between 0.3 nanometers and 50 nanometers.

It is a further objective of this invention to enable the economic recovery of heavy metal contaminants that have been collected by the filter element.

It is a further objective of this invention to incorporate said free-standing composite particles in a filter bed or cartridge for removing undesired contaminants from a liquid.

It is a further objective of this invention to enable the reuse of the free-standing composite particle without incurring significant cost or loss of filtration capacity.

EXAMPLES

The following procedures, which are illustrative in nature and provided only as non-limiting examples, describe steps that may be used for fabricating the reusable Free-Standing Composite Particles (FSCPs).

AERATION METHOD 1: Granular activated carbon particles (GAC), formed at any temperature below 800 C, are further activated by a steam injection technique at 800 C. The GAC particle size selected for processing in one embodiment consists of those particles that pass through a US #10 mesh sieve (2.00 mm aperture) but are stopped by a US #12 mesh sieve (1.68 mm aperture). The laboratory-scale steam injection technique consists of placing about 20 g of the starting GAC in the high temperature zone of a two zone furnace capable of reaching 1000 C in the high temperature zone. The furnace is purged with nitrogen gas flowing at 1.5 L/min while heating the furnace to its operating temperatures. The low temperature zone is set at 400 C (752 F) and the high temperature zone at 800 C (1472 F). When the zones reach their set temperatures, the nitrogen gas flow is maintained at 1.5 L/min for 30 minutes to allow for temperature stabilization, after which the flow rate is set to 3 L/min. A syringe pump is used to inject 10 ml of distilled water into the low temperature furnace zone at the rate of 10 ml/hr while the nitrogen gas flow rate is at 3 L/min. When the steam activation is complete, the furnace is allowed to cool to room temperature under a nitrogen flow rate of 1.5 L/min. The newly activated GAC is removed from the furnace and placed in a closed container for storage as may be desired. The 800 C activated GAC material is subsequently infused with a thin transition metal layer, achieved by adding 5 gram lots of the 800 C activated GAC to a beaker with 25 ml of acetone containing, as an example, 4 g of ferric nitrate and 1 g of cobalt powder. The beaker is placed in a sonic bath for 30 minutes, after which the 5 g lots of metal coated GAC are placed in an oven at 105 C for 12 minutes. From there, the still moist sample is placed on a quartz boat and placed in the high temperature zone of a two zone furnace, immediately after which a flow of a 5% hydrogen in 95% argon carrier gas flow is started. The furnace is brought to its standard nanotube growth operating point, typically 225 C in the first zone and 775 C in the growth zone. The furnace is allowed to equilibrate for 30 minutes with the carrier gas flow, and then an injection of 10 ml of liquid 2-propanol is started at the rate of 5 ml/hr. When the injection is complete, the furnace is allowed to cool to room temperature and the sample is removed, weighed and stored in a sealed container. A typical growth results in a 25% to 30% mass gain compared to the mass of the dry GAC prior to metal infusion. A 1 g amount of the GAC with carbon nanotubes grown on it (CNT/GAC) is then placed in a flask holding 0.5 g of dopamine hydrochloride in 250 ml of TRIS base. TRIS base is 6.075 ml of Trisma (i.e., Tris(hydroxymethyl)aminomethane) in 300 ml of deionized water. The solution has a pH of about 8.5 and dopamine is polymerized to polydopamine by pumping air through the liquid at the rate of about 1.5 L/minute for up to 3 hours. Following aeration and the formation of polydopamine both on the composite particles and in solution, the sample is vacuum filtered, rinsed multiple times with a total of 500 ml of deionized water and allowed to dry in the vacuum frit at 70 C overnight. The material is then removed from the frit, weighed and put in a sealed container until it is used for testing. The aeration method has also been used with 800 C activated GAC sized by US 35 mesh (500 micron aperture) and US 60 mesh (250 micron aperture) sieves as well as US 35 mesh and US 40 mesh (400 micron aperture) sieves. All procedures and amounts of chemicals are the same as described in the immediately preceding paragraph. Sample amounts prepared for testing were 0.25 g, 0.5 g, 1.0 g and 1.5 g in all cases.

AERATION METHOD II: Sample preparation of GAC and for metal film deposition and CNT growth on the GAC is the same as described above. Once the CNT/GAC particles have been prepared, the same amounts of CNT/GAC as above were each placed in a flask containing 150 ml of McIlvaine's buffer at pH 5, to which is added 0.01 g of dopamine and 0.1 g of sodium periodate. The solution was aerated by injecting room air into the flask at about 1.5 L/min for up to 24 hours to form the PDA film.

CHEMICAL METHOD 1: GAC particles activated at temperatures below 800 C are furthered activated by the previously described steam injection technique to 800 C. The GAC particle size selected for processing consists of particles that pass through a US #10 mesh sieve (2.00 mm aperture) but are stopped by a US #12 mesh sieve (1.68 mm aperture). Sample preparation of GAC and for metal film deposition and CNT growth on the GAC is the same as described above in aeration methods. Once the CNT/GAC particles have been prepared, a 0.05 M sodium phosphate buffer solution is prepared by dissolving 2.53 g of monobasic sodium phosphate in 21.1 ml of DI (deionized) water, and dissolving 4.10 g of dibasic sodium phosphate in 28.9 ml of DI water, and the two solutions added to 950 ml of DI water. To produce the polymer for coating the CNT/GAC particles, 0.125 g of L-dopa are added to 90 ml of the prepared 0.05 M sodium phosphate buffer described above and stirred for 15 minutes, following which 108 mg of sodium periodate is added and the mixture stirred for an additional 5 minutes. Finally, 60 ml of the 0.05 M buffer is added to the 90 ml and stirred for 3 minutes, following which 1 g of the 800 C activated CNT/GAC material is added. The resulting 150 ml of solution is stirred for at least 24 hours. Following the formation of polymer both on the composite particles and in solution, the sample is vacuum filtered, rinsed multiple times with a total of 500 ml of deionized water, and allowed to dry at 70 C in the vacuum frit overnight. The material is then removed from the frit, weighed and put in a sealed container until it is used for testing. The chemical method has also been used with 800 C activated GAC particles sized by US 35 mesh (500 micron aperture) and US 60 mesh (250 micron aperture) sieves, as well as US 35 mesh and US 40 mesh (400 microns) sieves. All procedures and amounts of chemicals are the same as described in the immediately preceding paragraph. Sample amounts used for testing were 0.25 g, 0.5 g, 1.0 g and 1.5 g in all cases.

CHEMICAL METHOD 2: CNT on GAC (CNT/GAC) particles are prepared as described in the preceding paragraphs. Measured amounts of the composite particles as listed in the preceding paragraph are placed in flasks containing 150 ml of McIlvaine's buffer at pH 5, to which is added 0.01 g of dopamine and 0.1 g of sodium periodate. The solution is then covered and placed on a shake table for 24 hours, with no intentional aeration. Following the formation of polydopamine both on the composite particles and in solution, the sample is vacuum filtered, rinsed multiple times with a total of 500 ml of deionized water and allowed to dry in the vacuum frit overnight at 70 C. The material is then removed from the frit, weighed and put in a sealed container until it is used for testing. The chemical method has also been used with 800 C activated GAC particles sized by US 35 mesh (500 micron aperture) and US 60 mesh (250 micron aperture) sieves as well as US 35 mesh and US 40 mesh (400 microns) sieves. All procedures and amounts of chemicals are the same as described in the immediately preceding paragraph. Sample amounts used for testing were 0.25 g, 0.5 g, 1.0 g and 1.5 g in all cases.

Testing for Heavy Metal Adsorption:

All prepared samples were tested for their heavy metal adsorption capability in the same manner. Separate stock solutions containing cadmium, lead, zinc, mercury, chromium and other metals were prepared, typically in the single digit ppm range of the individual contaminants. A typical adsorption test was run with a sample of the fully processed composite particles as follows:

1) varying masses of the composite particles were mixed with separate 50 ml amounts of each of the various contaminant stock solutions;
2) each mixture was stirred at room temperature for specified periods of time to simulate the conditions that would exist in the second container of the apparatus shown in FIG. 10;
3) the composite test particles were filtered out of the stock solution using a polystyrene vacuum filter bottle with a 0.450 micron pore, 50 mm diameter frit;
4) the effluent was tested for metal content in a Perkin Elmer atomic absorption analyzer (model AAnalyst 200).

Contaminant Metal Recovery Following Adsorption

CHELATION METHOD: One gram amounts of the composite particles were added to 50 ml of water with 8.12 ppm Zn contamination for adsorption testing. The 50 ml particle/test solution mixture was stirred with a magnetic stirrer for 45 minutes. The solution with the composite particles was then filtered to separate the particles from the effluent. Atomic absorption analysis was performed on the effluent to determine the remaining Zn concentration. Composite particle samples were allowed to dry and then placed in 50 ml of 100 mM EDTA and stirred for 45 minutes. The particle/EDTA mixture was filtered through a vacuum frit followed by rinsing with 200 ml of DI water. The resulting 250 ml of solution was then analyzed for Zn content. The results are presented in Table 1. TGA (thermogravimetric analysis) indicated that the metal-stripped composite particle still had a PDA (polydopamine) coating. The combined results confirm the potential for contaminant metal recovery and composite particle reuse.

TABLE 1

Adsorbed Metal Recovered after Rinsing Particle with EDTA

| Metal | Initial Concentration (mg/L) | Amount Adsorbed (mg/L) | Recovered (mg/L) | Amount (%) |
| --- | --- | --- | --- | --- |
| Zn | 8.12 | 6.97 | 4.73 | 68 |
| Zn | 8.12 | 5.16 | 5.12 | 99 |
| Zn | 8.12 | 7.19 | 5.94 | 83 |

PDA FILM DISSOLUTION METHOD: Table 2 presents results for metal recovery with chromium as the contaminant, except that ordinary household bleach was substituted for the EDTA. The results again clearly establish the feasibility of recovering the adsorbed metal contaminants and enabling reuse of the composite particle. In this case, however, the particle needs to be recoated with PDA (polydopamine) for reuse. The test solution contained 8.05 ppm of Cr ions. Adsorption took place with 1 gram of composite particles in a 50 ml volume of test solution. The 50 ml volume was placed on a shake table for 3 hours, then the effluent was filtered and the particles allowed to dry.

TABLE 2

Adsorbed Metal Recovered after Rinsing Particle with Household Bleach

| Metal | Initial Concentration (mg/L) | Amount Adsorbed (mg/L) | Recovered (mg/L) | Amount % |
| --- | --- | --- | --- | --- |
| Cr | 8.05 | 7.1 | 4.03 | 57 |

TGA (thermogravimetric analysis) results confirmed that the PDA coating was entirely removed from the composite particle, leaving it ready for recoating with fresh PDA and subsequent reuse for removing heavy metal contaminants from water.

Removal of Composite Particles from Solution

The composite particles of the present invention may be removed from the reduced contaminant or fully decontaminated solution by the simple process of cyclonic separation. The operating principles of such devices are well-known and can operate with efficiencies for particle removal approaching 99%, depending on particle specific mass and average size as well as liquid flow rates and pressures. Furthermore, operating two or more cyclonic separators in tandem can achieve the desired particle recovery percentage needed to reduce the remaining contaminant levels to any acceptable range. The novelty here is the intended recovery of the contaminant-laden composite particles not for discard but for further processing and reuse.

What is claimed is:

1. A composite particle comprising:
   a) a core particle, comprising granular activated carbon (GAC), said activated carbon having been formed at an activation temperature of at least 800° C.;
   b) a film layer of one or more transition metal atoms, which covers at least a portion of said core particle;
   c) at least one carbon nanotube attached to and covering at least a portion of said transition metal layer; and
   d) an outer layer of a polymeric material derived from dopamine or another polymer derived from catechol or dopamine covering at least a portion of said carbon nanotube and covering at least a portion of said core particle and transition metal layer not covered by said carbon nanotube.

2. The composite particle of claim 1 wherein said composite particle has a largest dimension, and said largest dimension is in the range from one (1) micron to ten (10) millimeters.

3. The composite particle of claim 1 wherein the said carbon nanotube has a length, and where its length is greater than five (5) nanometers; and where said carbon nanotube has a chirality and a purity, which chirality and purity may be of any level; and where said carbon nanotube has one or more walls.

4. The composite particle of claim 1 wherein the said polymeric material layer has a thickness, and where the thickness is in the range between three (3) angstroms (0.3 nanometers) and fifty (50) nanometers.

5. A method for making an adsorbent composite particle, the method comprising the steps of:
  a) selecting a core particle made of granular activated carbon (GAC), said core particle having been activated at a temperature of at least 800° C.;
  b) adding a film layer of one or more transition metal atoms by combining said core particles with acetone or another non-polar solvent and one or more transition metal compounds that dissolve in non-polar solvents, and placing said mixture in a container with a means for agitating the mixture;
  c) removing said core particles, which now have a film metal layer, from the said mixture;
  d) heating said particles with said film metal layer in an oxygen free atmosphere to a temperature greater than or equal to 600° C., but not to exceed 800° C.;
  e) attaching at least one carbon nanotube to said core particle with film metal layer using a chemical vapor deposition method;
  f) placing the resulting particles in an aqueous solution comprising a buffer, and dopamine or catechol; and
  g) either aerating the solution, using air as the oxidant, for up to 24 hours or adding an additional oxidant and aerating said solution for up to 24 hours, both of which result in a layer of polymeric material derived from dopamine or another polymer derived from catechol or dopamine at least partially covering said core particle and/or film metal layer, and at least partially covering said carbon nanotube.

6. An apparatus for removing heavy metal contaminants from water, said apparatus comprising:
  a) a first water-tight container for holding a quantity of the composite particles of claim 1, which composite particles have a specific gravity greater than 1 gram per cubic centimeter;
  b) said first container being connected to a conveyance apparatus which is configured to be opened and closed on demand, thereby admitting controlled amounts of the contents of the first container into a second container;
  c) said second container containing a heavy metal contaminated liquid and having fixed in it a controllable device that promotes mixing of the contents of the second container;
  d) said second container having an outlet conveyance configured to allow the mixture of the contents of the second container to move from the said second container into a third container which has a circular cross-section;
  e) said third container being in the form of a hydrocyclone separator designed so that the particles from the first container that are immersed in the liquid of the second container move by centrifugal force to the outer wall of the hydrocyclone separator and fall to the bottom of said third container;
  f) said hydrocyclone separator having a conveyance apparatus for discharging any remaining liquid into a final container or destination, said conveyance apparatus having a mesh screen placed over the outlet of the conveyance apparatus to capture any remaining particles; and
  g) a final container or other destination into which any said remaining liquid flows from the third container.

7. The apparatus of claim 6 wherein one or more additional hydrocyclone containers and conveyance apparatuses are inserted between the second container and final container/destination to assure that the accidental discharge of particles introduced from the first container is kept to a minimum before entering the final container/destination.

8. A method for removing heavy metal contaminants from water, said method comprising the steps of:
  a) selecting a quantity of composite particles, each of said particles comprising:
    1) a core particle, comprising granular activated carbon (GAC), said activated carbon having been formed at an activation temperature of at least 800° C.;
    2) a film layer of one or more transition metal atoms, which covers at least a portion of said core particle;
    3) at least one carbon nanotube attached to and covering at least a portion of said transition metal layer; and
    4) an outer layer of a polymeric material derived from dopamine or another polymer derived from catechol or dopamine covering at least a portion of said carbon nanotube and covering at least a portion of said core particle and transition metal layer not covered by said carbon nanotube;
  b) placing a said quantity of composite particles into a first container, and dispensing a portion of said composite particles through a dispenser mechanism to a second container containing a quantity of water contaminated with heavy metals;
  c) mixing said composite particles with said contaminated water;
  d) dispensing the mixture of composite particles and water into a third container, said third container being a hydrocyclone separator;
  e) subjecting the mixture to the hydrocyclone separator;
  f) adding the use of one or more additional hydrocyclone separators in a series flow sequence, the final hydrocyclone separator in the series flow sequence having a conveyance apparatus for discharging any remaining water into a final container or destination, said conveyance apparatus having a mesh screen placed over the outlet of the conveyance apparatus to capture any remaining particles, wherein said mesh screen is made of stainless steel, polypropylene or other material which is removeable, durable and to which said composite particles do not stick; and
  g) discharging the said remaining water into a final container or destination.

9. The method of claim 8, which further removes contaminants from composite particles, said method additionally comprising the steps of:
  removing heavy metal contaminants from the said composite particles by rinsing said composite particles with ethylenediaminetetraacetic acid (EDTA) or another chelating agent; and
  capturing the resulting effluent.

10. The method of claim 8, which further removes contaminants from composite particles, said method additionally comprising the steps of:
  removing heavy metal contaminants from the said composite particles by rinsing said composite particles with 10% sodium hypochlorite or another basic solution; and
  capturing the resulting effluent.

* * * * *